United States Patent
Anand et al.

(10) Patent No.: US 9,154,963 B2
(45) Date of Patent: Oct. 6, 2015

(54) METHODS AND APPARATUSES FOR FLASH WCDMA FREQUENCY SCANS

(71) Applicant: QUALCOMM Incorporated, San Diego, CA (US)

(72) Inventors: Raghavendra Shyam Anand, Hyderabad (IN); Michael L. McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 13/692,877

(22) Filed: Dec. 3, 2012

(65) Prior Publication Data

US 2013/0343267 A1  Dec. 26, 2013

Related U.S. Application Data

(60) Provisional application No. 61/663,733, filed on Jun. 25, 2012.

(51) Int. Cl.
*H04L 12/28* (2006.01)
*H04W 16/14* (2009.01)
*H04W 48/08* (2009.01)
*H04J 3/00* (2006.01)

(52) U.S. Cl.
CPC .............. *H04W 16/14* (2013.01); *H04W 48/08* (2013.01)

(58) Field of Classification Search
CPC ...... H04W 16/14; H04B 7/2628; H04J 13/00; H04L 67/1061; H04L 45/00
USPC ............................ 455/422, 434, 436; 370/342
See application file for complete search history.

(56) References Cited

U.S. PATENT DOCUMENTS

| | | | |
|---|---|---|---|
| 8,437,754 B2 * | 5/2013 | Kubota et al. .................. | 455/434 |
| 2007/0189259 A1 * | 8/2007 | Sollenberger et al. ........ | 370/342 |
| 2007/0201422 A1 | 8/2007 | Swarts et al. | |
| 2007/0211669 A1 * | 9/2007 | Umatt et al. ................... | 370/335 |
| 2009/0034589 A1 * | 2/2009 | Hahm et al. ................... | 375/150 |
| 2009/0310654 A1 | 12/2009 | Ahmed et al. | |
| 2012/0015653 A1 * | 1/2012 | Paliwal et al. ............. | 455/435.1 |

FOREIGN PATENT DOCUMENTS

WO     WO 2005/018122 A1 *  2/2005  ................... 370/336

OTHER PUBLICATIONS

International Search Report and Written Opinion—PCT/US2013/047427—ISA/EPO—Feb. 20, 2014.

* cited by examiner

*Primary Examiner* — Shaq Taha
*Assistant Examiner* — Sasha Cintron Pacheco
(74) *Attorney, Agent, or Firm* — Darren M. Simon

(57) ABSTRACT

A method and apparatus of wireless communication are configured to capture, at a user equipment, one or more adjacent Universal Mobile Telecommunication System Terrestrial Radio Access Absolute Radio Frequency Channel Numbers (UARFCNs), extract a useful wide band signal from the one or more adjacent UARFCNs, perform a PSCH search on the useful wide band signal to obtain a composite PSCH signal, and reject the one or more UARFCNs where no peaks greater than a noise threshold are detected in the composite PSCH signal.

15 Claims, 9 Drawing Sheets

METHODS AND APPARATUSES FOR FLASH WCDMA FREQUENCY SCANS

CLAIM OF PRIORITY UNDER 35 U.S.C. §119

The present Application for Patent claims priority to Provisional Application No. 61/663,733 filed Jun. 25, 2012, entitled "Methods and Apparatuses for Flash WCDMA Frequency Scans," which is assigned to the assignee hereof, and hereby expressly incorporated by reference herein.

BACKGROUND

1. Field

Aspects of the present disclosure relate generally to wireless communication systems, and more particularly, to flow control in multiflow environments.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, WCDMA is a wide band system that operates over an approximately 5 MHz bandwidth. Furthermore, 3GPP provides 60 MHz in downlink in a band for deployment. In addition, the WCDMA channel raster is specified to be 200 KHz, carrier spacing to be from 4.4 MHz to 5.2 MHz, and the chip rate of the WCDMA system is approximately 3.84 MHz using a 0.22 roll off radio resource control (RRC) pulse shaping filter. Additionally, a frame in WCDMA frequency division duplex (FDD) is 10 ms and each frame is divided into 15 slots, and each slot is 2560 chips in length.

As a part of cell search operations, a user equipment (UE) is required to identify the slot boundary and frame boundary associated with a NodeB. For each NodeB, a dedicated primary synchronization channel (PSCH) is provided for purposes of slot boundary identification and a secondary synchronization channel (SSCH) is provided for frame boundary identification. The PSCH and SSCH are burst channels with a typical length of 256 chips with repetition rate of 2560 chips. Furthermore, the first 256 chips of each slot contain PSCH and SSCH signatures.

In addition, in WCDMA, PSCH identification procedures use a correlation matched to the PSCH signature of length 256 chips, for which the correlation procedure has a correlation structure or algorithm. Because of long periodicity of the PSCH (2560 chips), at least 2560 correlations are typically needed to identify the presence of an adjacent cell. Therefore, the time needed for a UE to identify a slot or frame boundary in an adjacent cell is proportional to the time required to reject potential UMTS Terrestrial Radio Access Absolute Radio Frequency Channel Numbers (UARFCNs) associated with an adjacent cell. Considering the small WCDMA raster of 200 KHz, the time required for performing correlation and UMTS rejection according to legacy procedures can be significant.

Therefore, an improved method of rejecting a group of adjacent UARFCNs is needed.

SUMMARY

Figure 1:
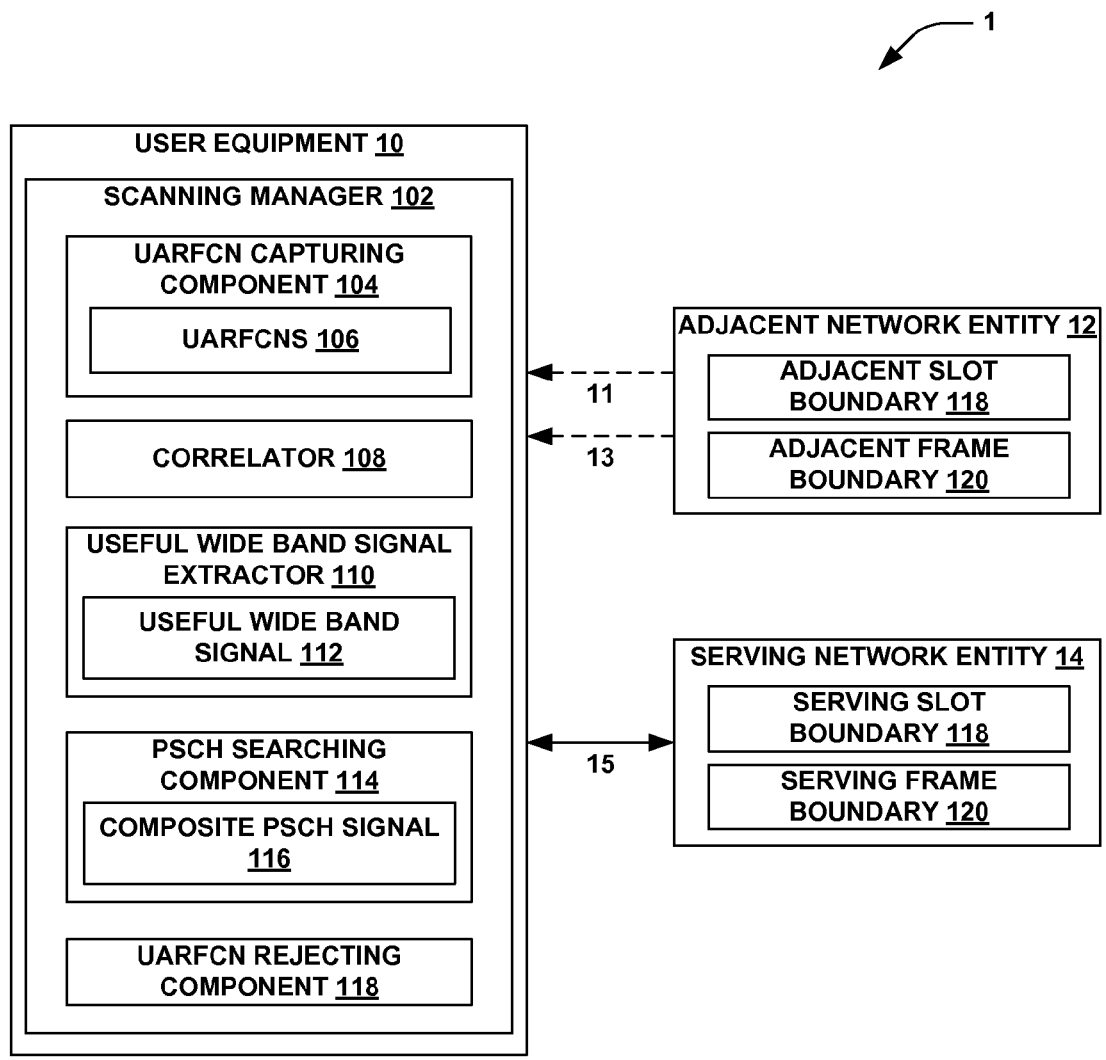
FIG. 1 is a system diagram illustrating aspects of a wireless environment according to the present disclosure.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect or the present disclosure, a method of wireless communication is presented that includes capturing, at a user equipment (UE), one or more adjacent Universal Mobile Telecommunication System Terrestrial Radio Access Absolute Radio Frequency Channel Numbers (UARFCNs). Furthermore, according to example methods, the UE may extract a useful wide band signal from the one or more adjacent UARFCNs, perform a PSCH search on the useful wide band signal to obtain a composite PSCH signal, and may reject the one or more UARFCNs where no peaks greater than a noise threshold are detected in the composite PSCH signal.

In addition, the present disclosure presents an apparatus for wireless communication, which may include means for capturing, at a user equipment, one or more adjacent UARFCNs. The example apparatus may further include means for extracting a useful wide band signal from the one or more adjacent UARFCNs. Furthermore, the example apparatus may include means for performing a PSCH search on the useful wide band signal to obtain a composite PSCH signal.

Additionally, the apparatus may include means for rejecting the one or more UARFCNs where no peaks greater than a noise threshold are detected in the composite PSCH signal.

Additionally, the present disclosure presents an example computer program product, which may include a computer-readable medium comprising code for capturing, at a user equipment, one or more adjacent UARFCNs, code for extracting a useful wide band signal from the one or more adjacent UARFCNs, code for performing a PSCH search on the useful wide band signal to obtain a composite PSCH signal, and code for rejecting the one or more UARFCNs where no peaks greater than a noise threshold are detected in the composite PSCH signal.

Furthermore, the present application presents an example apparatus for wireless communication, which may include at least one processor and a memory coupled to the at least one processor. In some examples, the at least one processor may be configured to capture one or more adjacent UARFCNs, extract a useful wide band signal from the one or more adjacent UARFCNs, perform a PSCH search on the useful wide band signal to obtain a composite PSCH signal, and reject the one or more UARFCNs where no peaks greater than a noise threshold are detected in the composite PSCH signal.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

According to aspects of the present disclosure, methods and apparatuses for supporting improved identification of slot and frame boundaries associated with adjacent UEs during cell search are provided. In an aspect, for example, to obtain a frame or slot boundary associated with an adjacent cell, a UE may quickly detect the presence of a PSCH in one or more UARFCNs and reject one or more UARFCNs depending on whether PSCH signal peaks are greater than a threshold value.

Referring to FIG. 1, a wireless communication system 1 is illustrated that improves rejection of one or more UARFCNs associated with an adjacent cell. System 1 includes a UE 10 that communicates with a serving network entity 14 to receive wireless network access via a communication link 15. Furthermore, UE 10 may receive one or more control or pilot signals from adjacent network entities 12, which may include signals on a PSCH channel 11 or SSCH channel 13.

Serving network entity 14 and adjacent network entity 12 may include one or more of any type of network component, such as an access point, including a base station (BS) or node B, a relay, a peer-to-peer device, an authentication, authorization and accounting (AAA) server, a mobile switching center (MSC), etc., that can enable UE 10 to communicate and/or that can establish and maintain link 15 and/or transmit via PSCH channel 11 or SSCH channel 13. Furthermore, adjacent network entity 12 may include an associated adjacent network entity slot boundary 120, which may serve as a reference for slot synchronization for communications conducted with adjacent network entity 12. In addition, adjacent network entity 12 may include an associated adjacent network entity frame boundary 122, which may serve as a reference for frame synchronization for communications conducted with adjacent network entity 12. Serving network entity 14 may include corresponding boundaries—namely, serving network entity slot boundary 124 and serving network entity frame boundary 126.

In an aspect, UE 10 may include a scanning manager 102, which may be configured to control operations associated with the UE scanning certain frequency bands for one or more signals transmitted by one or more adjacent network entities 12. In an aspect, scanning manager 102 may include a UARFCN capturing component 104, which may be configured to capture (e.g. through receiving and decoding a signal transmitted by a NodeB or other network entity) one or more UARFCNs. A UARFCN is related to a frequency or a frequency range of signals to be transmitted by the corresponding network entity. Additionally, the scanning manager 102 may include a correlator 108, which may correlate a captured UARFCN to a frequency or frequency range. Alternatively or additionally, scanning manager 102 may include a useful wide band signal extractor, which may be configured to extract a useful wide band signal 112, for example, in the frequencies correlating to the captured UARFCNs 106. In addition, scanning manager 102 may include a PSCH searching component 114 that may be configured to generate a composite PSCH signal 116. In an aspect, composite PSCH signal may be made up of each of individual received PSCH signals. Furthermore, scanning manager 102 may include a UARFCN rejecting component 118, which may reject the one or more captured UARFCNs where it determines that no peaks in the composite PSCH signal are greater than, or greater than or equal to, a configured noise threshold value.

Figure 2:
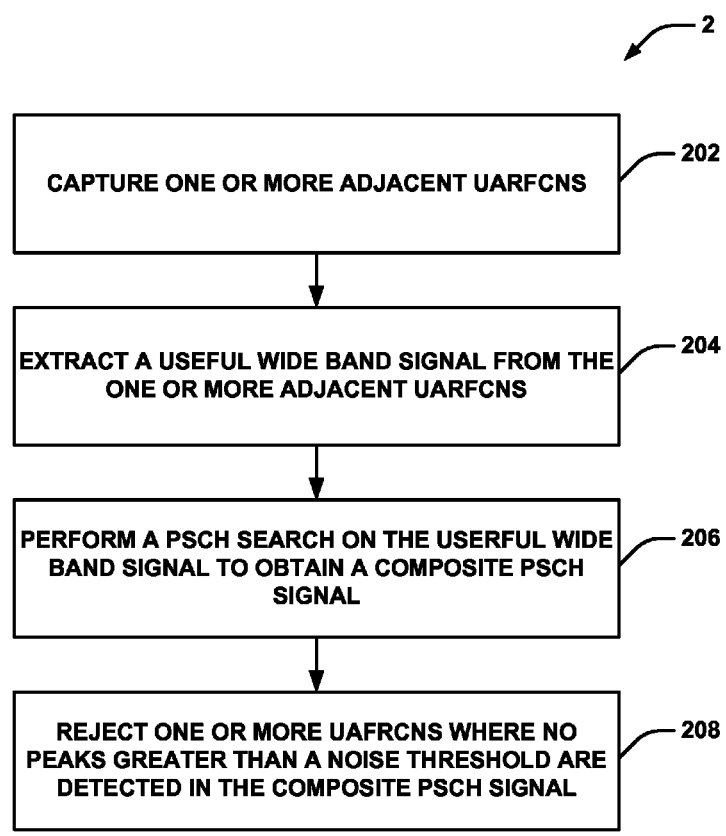
FIG. 2 is a flow diagram illustrating aspects of an example methodology for improved UE scanning operations according to the present disclosure.

FIG. 2 illustrates an example methodology 2 for quick UARFCN rejection in cell scanning procedures. In an aspect, at block 202, a UE may capture one or more UARFCNs associated with adjacent cells. This may be achieved using a wide band receiver, and in some examples, the UE may capture 2N+1 UARFCNs, where N may represent a quantity of UARFCNs present in a measurable frequency range greater than (or less than) a base UARFCN associated with a base frequency at which the wide band receiver is centered. Next, at block 204, the UE may extract a useful wide band signal from the one or more adjacent UARFCNs. In an example aspect, because the carrier frequency of each of the UARFCNs captured in the useful wide band signal may be separated by 0.2 MHz (e.g. Bands I, III, VIII, per 3GPP Specification TS 25.101, for example), the useful wide band signal may have a bandwidth of (2.5+2N×0.2+2.5) MHz. Furthermore, the UE may perform a PSCH search on the useful wide band signal to obtain a composite PSCH signal. In some aspects, the composite PSCH ($\Gamma(n)$) may be formed according to the following equation:

$$\Gamma(n) = \sum_{k=-N}^{N} C_{psc}(n) * e^{j\frac{10\pi nk}{F_s}}$$

where $C_{psc}$ is a primary synchronization code of a subject cell PSCH, $F_s$ is the sampling frequency on the PSCH, k is the frequency index of the PSCH sampling, and n is the time index of the PSCH sampling. This composite PSCH signal may be an aggregation of PSCH signals detected and/or received during the PSCH search. Then, at block 208, the UE may reject one or more UAFRCNs if no peaks of the composite PSCH signal are greater than a noise threshold value. By utilizing this or similar methods, UARFCNs may be quickly rejected to speed up cell searching procedures.

In an additional aspect that may be related to Long Term Evolution (LTE) technology, once an Evolved UARFCN (EUARFCN) is selected for initial acquisition by a UE, the UE may use more than one frequency hypothesis to minimize the effects of frequency offsets. Furthermore, the UE may attempt to identify the Primary Synchronization Signal (PSS) for each frequency hypothesis. In legacy systems, approximately 9,600×N correlations are performed. Using the composite signal contemplated herein in the LTE frequency hypothesis scenario, however, all frequency hypotheses are verified but only 9,600 correlations are searched. Additionally, in the WCDMA standard, PSCs are sampled at a 3.84 MHz sampling rate. This standard WCDMA sampling rate however, must be larger to accommodate sampling of all available PSCs. Furthermore, PSCs may be shifted, and the UE may be required to shift its frequency sampling offset to account for this shifting.

According to aspects of the present disclosure, a UE may sample PSCs at a legacy sampling rate, but may utilize a radio resource filter to shift a sampling frequency to a frequency $F_s$. After this shifting, the UE may sample the PSCs at the sampling frequency $F_s$ and combine the samples to obtain a composite signal. In an aspect, this composite signal Γ(n) may be formed according to the following algorithm, where $F_{hyp}$ corresponds to the frequency hypothesis and $C_{pss}$ corresponds to the PSS code:

$$\Gamma(n) = \sum_{k=-N}^{N} C_{pss}(n) * e^{j\frac{2\pi nk \times F_{hyp}}{F_s}}$$

where $F_s$ is again the sampling frequency on the PSCH, k is the frequency index of the PSCH sampling, and n is the time index of the PSCH sampling. In an aspect, the UE may reject one or more UAFRCNs if no peaks of the composite PSCH signal Γ(n) are greater than a noise threshold value. Again, by utilizing this or similar methods, UARFCNs may be quickly rejected to speed up cell searching procedures.

Figure 3:
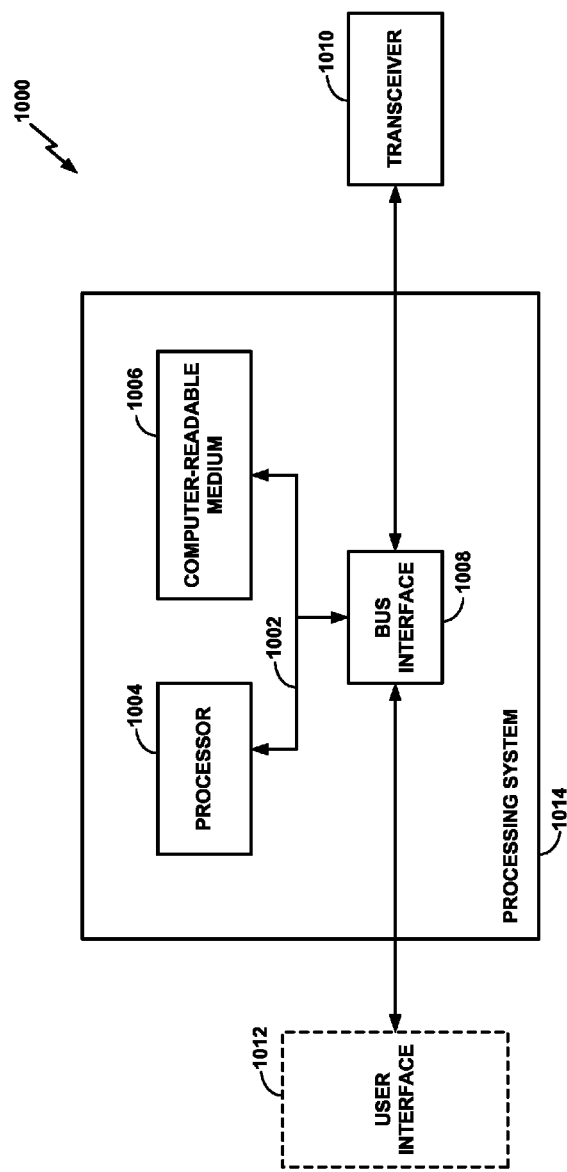
FIG. 3 is a block diagram illustrating an example of a hardware implementation for an apparatus employing a processing system.

FIG. 3 is a block diagram illustrating an example of a hardware implementation for an apparatus 1000 employing a processing system 1014. In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors, represented generally by the processor 1004, and computer-readable media, represented generally by the computer-readable medium 1006. The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described infra for any particular apparatus. The computer-readable medium 1006 may also be used for storing data that is manipulated by the processor 1004 when executing software.

Figure 4:
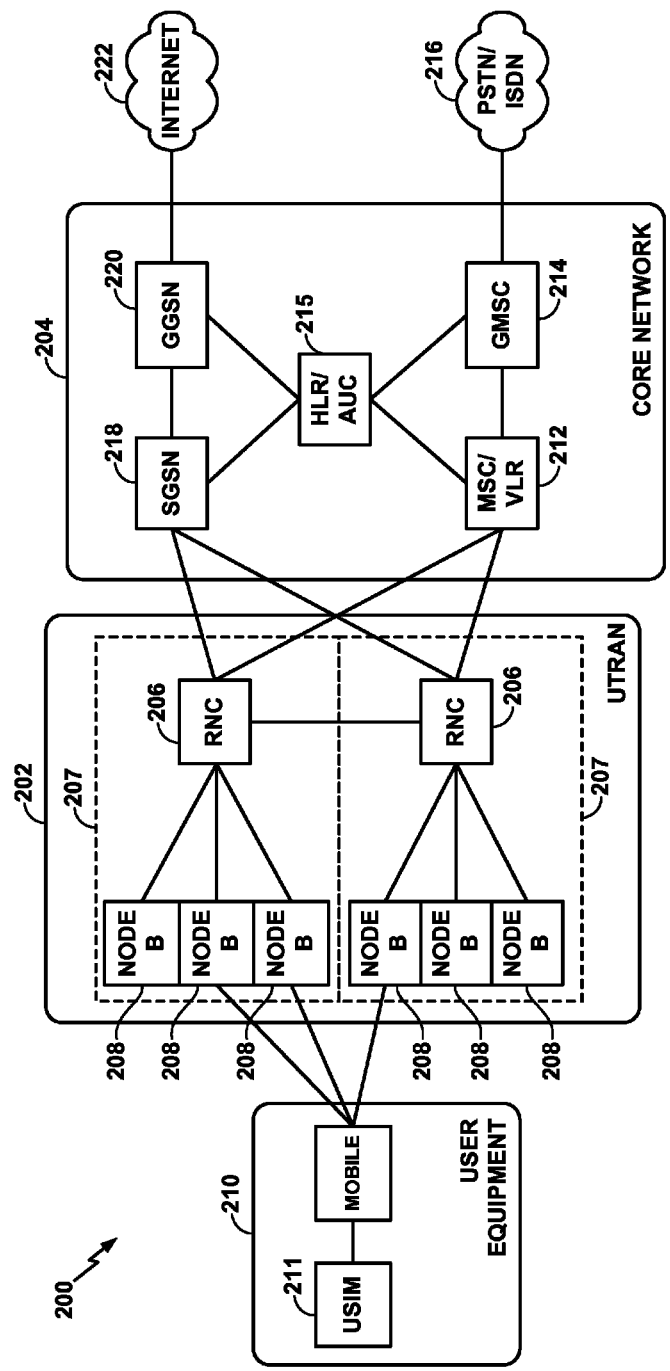
FIG. 4 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI. "HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 5:
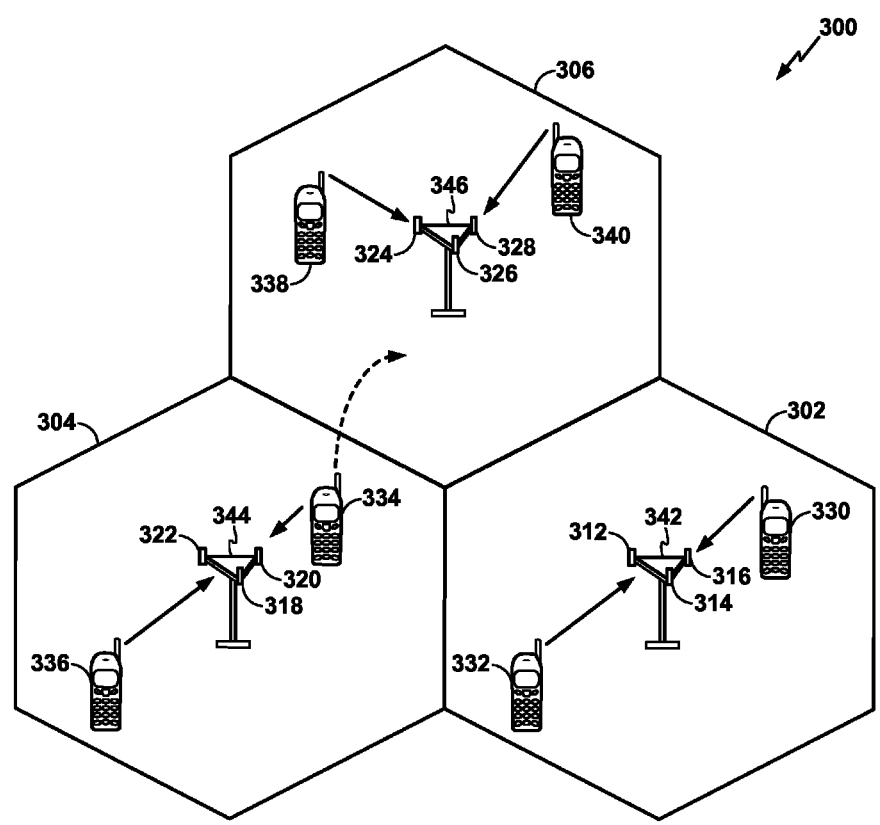
FIG. 5 is a conceptual diagram illustrating an example of an access network.

Referring to FIG. 5, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 4) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 6.

Figure 6:
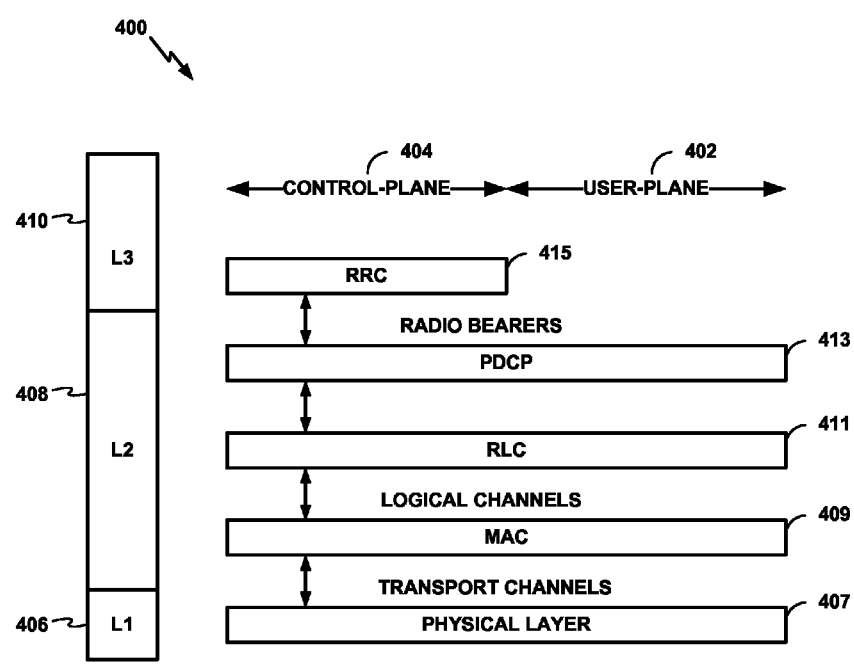
FIG. 6 is a conceptual diagram illustrating an example of a radio protocol architecture for the user and control plane.

Referring to FIG. 6 an example radio protocol architecture 400 relates to the user plane 402 and the control plane 404 of a user equipment (UE) or node B/base station. For example, architecture 400 may be included in a UE such as UE 1130 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 7:
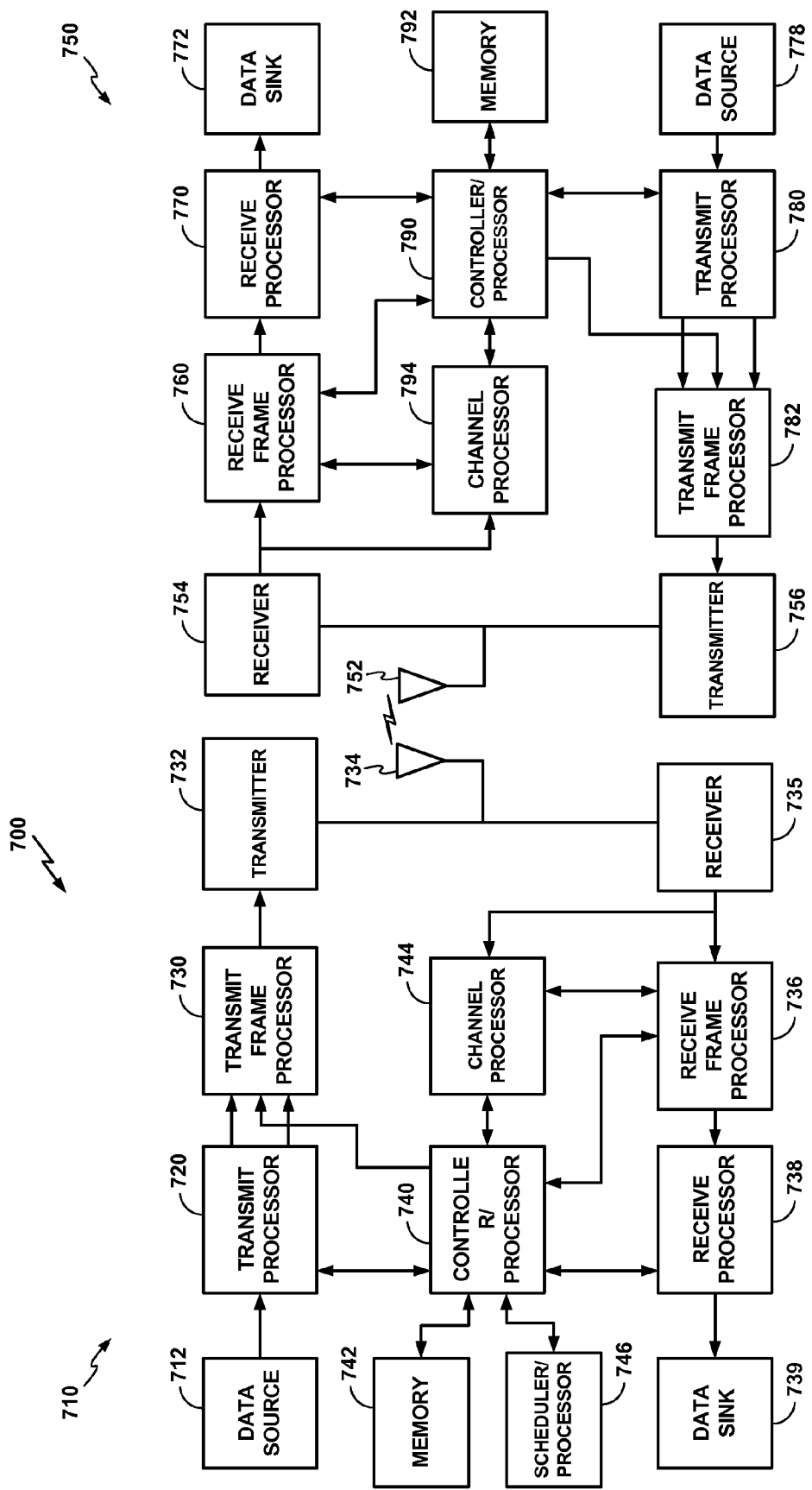
FIG. 7 is a block diagram conceptually illustrating an example of a Node B in communication with a UE in a telecommunications system.

FIG. 7 is a block diagram of a Node B 510 in communication with a UE 550, where the Node B 510 may be the Node B 208 in FIG. 4, and the UE 550 may be the UE 210 in FIG. 4. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 8:
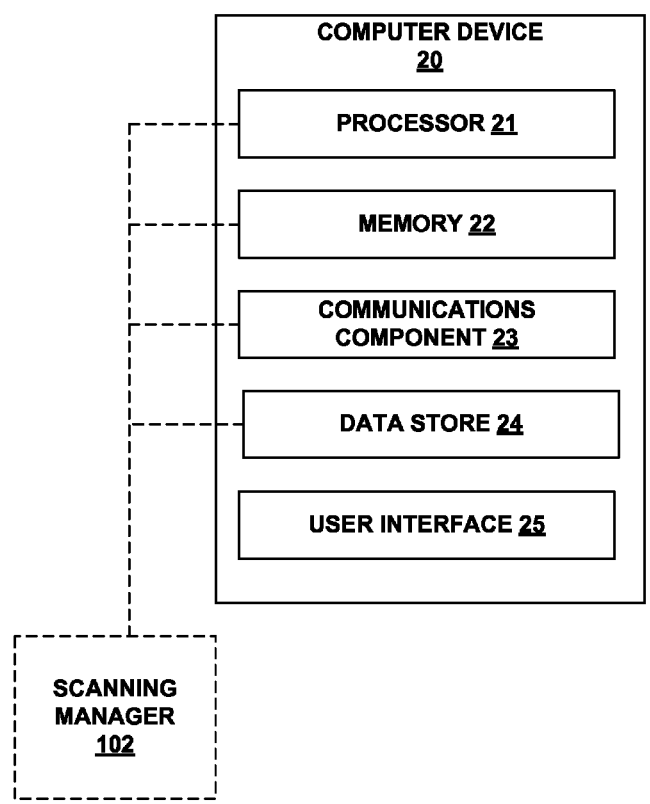
FIG. 8 is a block diagram of a computer device according to aspects of the present disclosure.

Referring to FIG. 8, in one aspect, UE 10, or the one or more network entities 12 or 14 (FIG. 1) may be represented by a specially programmed or configured computer device 20. Computer device 20 includes a processor 21 for carrying out processing functions associated with one or more of components and functions described herein. Processor 21 can include a single or multiple set of processors or multi-core processors. Moreover, processor 21 can be implemented as an integrated processing system and/or a distributed processing system.

Computer device 20 further includes a memory 22, such as for storing data used herein and/or local versions of applications being executed by processor 21. Memory 22 can include any type of memory usable by a computer, such as random access memory (RAM), read only memory (ROM), tapes, magnetic discs, optical discs, volatile memory, non-volatile memory, and any combination thereof.

Further, computer device 20 includes a communications component 23 that provides for establishing and maintaining communications with one or more parties utilizing hardware, software, and services as described herein. Communications component 23 may carry communications between components on computer device 20, as well as between computer device 20 and external devices, such as devices located across a communications network and/or devices serially or locally connected to computer device 20. For example, communications component 23 may include one or more buses, and may further include transmit chain components and receive chain components associated with a transmitter and receiver, respectively, or a transceiver, operable for interfacing with external devices. In an additional aspect, communications component 23 may be configured to receive one or more pages from one or more subscriber networks. In a further aspect, such a page may correspond to the second subscription and may be received via the first technology type communication services.

Additionally, computer device 20 may further include a data store 24, which can be any suitable combination of hardware and/or software, that provides for mass storage of information, databases, and programs employed in connection with aspects described herein. For example, data store 24 may be a data repository for applications not currently being executed by processor 21.

Computer device 20 may additionally include a user interface component 25 operable to receive inputs from a user of computer device 20, and further operable to generate outputs for presentation to the user. User interface component 25 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 25 may include one or more output devices, including but not limited to a display, a speaker, a haptic feedback mechanism, a printer, any other mechanism capable of presenting an output to a user, or any combination thereof.

In a mobile station implementation, such as for UE 10 of FIG. 1, computer device 20 may include scanning manager 102 (FIG. 1), such as in specially programmed computer readable instructions or code, firmware, hardware, or some combination thereof.

Figure 9:
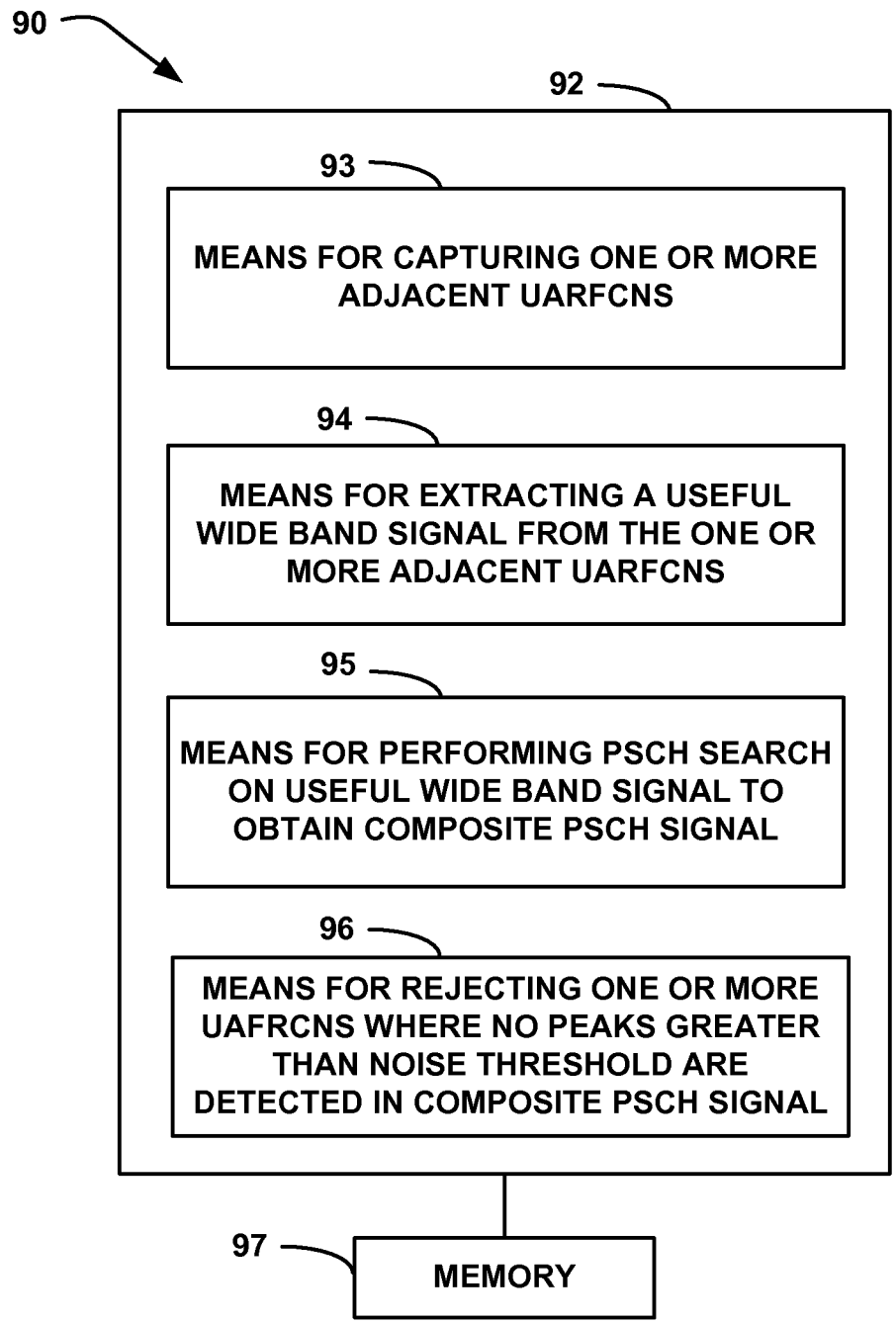
FIG. 9 is a block diagram of a logical grouping of electrical components according to aspects of the present disclosure.

Referring to FIG. 9, an example system 90 is displayed for improved network component HSUPA communication. For example, system 90 can reside at least partially within one or more UEs or network components. It is to be appreciated that system 90 is represented as including functional blocks, which can be functional blocks that represent functions implemented by a processor, software, or combination thereof (e.g., firmware). System 90 includes a logical grouping 92 of electrical components that can act in conjunction. For instance, logical grouping 92 can include means for capturing one or more adjacent UARFCNs (Block 93). For example, in an aspect, the means 93 may include UARFCN capturing component 104 (FIG. 1). Additionally, logical grouping 92 can include means for extracting a useful wide band signal from the one or more adjacent UARFCNs (Block 94). For example, in an aspect, the means 94 may include useful wide band signal extractor 110 (FIG. 1). In an additional aspect, logical grouping 92 can include means for performing a PSCH search on the useful wide band signal to obtain a composite PSCH signal (Block 95). In an aspect, the means 95 may comprise PSCH searching component 114 (FIG. 1). Furthermore, logical grouping 92 can include means for rejecting one or more UAFRCNs where no peaks greater than the noise threshold are detecting in the composite PSCH signal (Block 96). In an aspect, the means 96 may comprise UARFCN rejecting component 118 (FIG. 1).

Additionally, system 90 can include a memory 97 that retains instructions for executing functions associated with the electrical components 93, 94, 95, and 96, stores data used or obtained by the electrical components 93, 94, 95, and 96, etc. While shown as being external to memory 97, it is to be understood that one or more of the electrical components 93, 94, 95, and 96 can exist within memory 97. In one example, electrical components 93, 94, 95, and 96 can comprise at least one processor, or each electrical component 93, 94, 95, and 96 can be a corresponding module of at least one processor. Moreover, in an additional or alternative example, electrical components 93, 94, 95, and 96 can be a computer program product including a computer readable medium, where each electrical component 93, 94, 95, and 96 can be corresponding code.

Furthermore, several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    capturing, at a user equipment, a plurality of adjacent Universal Mobile Telecommunication System Terrestrial Radio Access Absolute Radio Frequency Channel Numbers (UARFCNs);
    correlating the plurality of adjacent UARFCNs with a plurality of frequencies;
    extracting a useful wide band signal from the plurality of frequencies corresponding to the plurality of adjacent UARFCNs;
    performing a primary synchronization channel (PSCH) search on the useful wide band signal to obtain a composite PSCH signal; and
    rejecting the plurality UARFCNs in performing a cell search procedure where no peaks greater than or equal to a noise threshold are detected in the composite PSCH signal;
    wherein the extracting is performed using a wide band receiver, and wherein the plurality of adjacent UARFCNs comprise 2N+1 UARFCNs, where N is a quantity of UARFCNs present in a measurable frequency range greater than or less than a base UARFCN associated with a base frequency at which the wide band receiver is centered.

2. A non-transitory computer-readable medium storing computer executable code, comprising:
    code for capturing, at a user equipment, a plurality of adjacent Universal Mobile Telecommunication System Terrestrial Radio Access Absolute Radio Frequency Channel Numbers (UARFCNs);
    code for correlating the plurality of adjacent UARFCNs with a plurality of frequencies;
    code for extracting a useful wide band signal from the plurality of frequencies corresponding to the plurality of adjacent UARFCNs;
    code for performing a primary synchronization channel (PSCH) search on the useful wide band signal to obtain a composite PSCH signal; and
    code for rejecting the plurality of UARFCNs in performing a cell search procedure where no peaks greater than or equal to a noise threshold are detected in the composite PSCH signal,
    wherein the code for extracting extracts the useful wide band signal using a wide band receiver, and wherein the plurality of adjacent UARFCNs comprise 2N+1 UARFCNs, where N is a quantity of UARFCNs present in a measurable frequency range greater than or less than a base UARFCN associated with a base frequency at which the wide band receiver is centered.

3. An apparatus for wireless communication, comprising:
    at least one processor; and
    a memory coupled to the at least one processor, wherein the at least one processor is configured to:
        capture a plurality of adjacent Universal Mobile Telecommunication System Terrestrial Radio Access Absolute Radio Frequency Channel Numbers (UARFCNs);
        correlate the plurality of adjacent UARFCNs with a plurality of frequencies;
        extract a useful wide band signal from the plurality of frequencies corresponding to the plurality of adjacent UARFCNs;
        perform a primary synchronization channel (PSCH) search on the useful wide band signal to obtain a composite PSCH signal; and
        reject the plurality of UARFCNs in performing a cell search procedure where no peaks greater than or equal to a noise threshold are detected in the composite PSCH signal;
    wherein the at least one processor is configured to extract the useful wide band signal using a wide band receiver, and wherein the plurality of adjacent UARFCNs comprise 2N+1 UARFCNs, where N is a quantity of UARFCNs present in a measurable frequency range greater than or less than a base UARFCN associated with a base frequency at which the wide band receiver is centered.

4. The method of claim 1, wherein the composite PSCH signal comprises an aggregation of a plurality of PSCH signals received over the plurality of frequencies corresponding to the plurality of adjacent UARFCNs.

5. The method of claim 1, wherein:
    the composite PSCH signal is based on samples of one or more primary synchronization codes of one or more PSCH signals received over the plurality of frequencies corresponding to the plurality of adjacent UARFCNs.

6. The method of claim 1, wherein the plurality of adjacent UARFCNs comprise a plurality of evolved UARFCNs (EUARFCN).

7. The method of claim 6, wherein the extracting is based on two or more frequency hypotheses.

8. The method of claim 7, wherein:
the extracting further comprises identifying a primary synchronization signal for each of the two or more frequency hypotheses;
the composite PSCH signal is based on samples of one or more primary synchronization codes of one or more PSCH signals of the plurality of adjacent UARFCNs; and
the samples are obtained based on a shifted sampling frequency that is equal to a sampling frequency on a corresponding PSCH shifted by a corresponding frequency within the two or more frequency hypotheses.

9. The method of claim 1, wherein performing the PSCH search includes performing a plurality of PSCH searches over a plurality of frequency shifted samples of the useful wide band signal to obtain the composite PSCH signal, wherein the plurality of frequency shifted samples are based on a plurality of frequency hypotheses.

10. The apparatus of claim 3, wherein the composite PSCH signal comprises an aggregation of a plurality of PSCH signals received over the plurality of frequencies corresponding to the plurality of adjacent UARFCNs.

11. The apparatus of claim 3, wherein:
the composite PSCH signal is based on samples of one or more primary synchronization codes of one or more PSCH signals received over the plurality of frequencies corresponding to the plurality of adjacent UARFCNs.

12. The apparatus of claim 3, wherein the plurality of adjacent UARFCNs comprise a plurality of evolved UARFCNs (EUARFCN).

13. The apparatus of claim 12, wherein the at least one processor is further configured to extract the useful wide band signal based on two or more frequency hypotheses.

14. The apparatus of claim 13, wherein:
the at least one processor is further configured to extract the useful wide band signal by identifying a primary synchronization signal for each of the two or more frequency hypotheses;
the composite PSCH signal is based on samples of one or more primary synchronization codes of one or more PSCH signals of the plurality of adjacent UARFCNs; and
the samples are obtained based on a shifted sampling frequency that is equal to a sampling frequency on a corresponding PSCH shifted by a corresponding frequency within the two or more frequency hypotheses.

15. The apparatus of claim 3, wherein the at least one processor is further configured to perform the PSCH search at least in part by performing a plurality of PSCH searches over a plurality of frequency shifted samples of the useful wide band signal to obtain the composite PSCH signal, wherein the plurality of frequency shifted samples are based on a plurality of frequency hypotheses.

* * * * *